United States Patent
Mashiki (10) Patent No.: US 7,331,328 B2
(45) Date of Patent: Feb. 19, 2008

(54) CONTROL DEVICE OF FUEL SYSTEM OF INTERNAL COMBUSTION ENGINE

(75) Inventor: Zenichiro Mashiki, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/448,022

(22) Filed: Jun. 7, 2006

(65) Prior Publication Data

US 2007/0006849 A1    Jan. 11, 2007

(30) Foreign Application Priority Data

Jul. 6, 2005    (JP)    ............... 2005-197833

(51) Int. Cl.
*F02B 7/00* (2006.01)
*F02B 7/04* (2006.01)

(52) U.S. Cl. .................. 123/431; 123/299

(58) Field of Classification Search ............. 123/299, 123/431, 300, 430, 339, 491, 496, 497, 499, 123/500, 501, 503
See application file for complete search history.

(56) References Cited

U.S. PATENT DOCUMENTS

| | | | | |
|---|---|---|---|---|
| 5,438,967 | A * | 8/1995 | Ito | 123/339.12 |
| 6,959,693 | B2 * | 11/2005 | Oda | 123/431 |
| 7,201,145 | B2 * | 4/2007 | Matsumura | 123/430 |
| 2001/0027641 | A1 | 10/2001 | Clarke et al. | |
| 2004/0154386 | A1 | 8/2004 | Shinzawa | |
| 2005/0235958 | A1 | 10/2005 | Matsumura | |

FOREIGN PATENT DOCUMENTS

| | | |
|---|---|---|
| DE | 41 11 341 A1 | 10/1992 |
| EP | 1 143 128 A2 | 10/2001 |
| EP | 1 445 455 A2 | 8/2004 |
| EP | 1 520 981 A2 | 4/2005 |
| EP | 1 531 261 A1 | 5/2005 |
| JP | A 2000-008917 | 1/2000 |
| JP | A 2001-41088 | 2/2001 |
| JP | A 2002-61529 | 2/2002 |
| JP | A 2003-513193 | 4/2003 |

* cited by examiner

*Primary Examiner*—Mahmoud Gimie
(74) *Attorney, Agent, or Firm*—Oliff & Berridge, PLC (57) ABSTRACT

An engine control device executes a mechanism of controlling a fuel system during idling including the step of detecting an engine speed NE and an engine load, the step of determining whether fuel can be injected at normal feed pressure from an in-cylinder injector during idling, the step of detecting or estimating a fuel temperature T in a high-pressure delivery pipe, the step of stopping the high-pressure fuel pump and injecting fuel from the in-cylinder injector at the normal feed pressure when the fuel temperature T is not greater than $T(0)$, the step of stopping the high-pressure fuel pump and injecting fuel at the pressure greater than the normal feed pressure when the fuel temperature T is greater than $T(0)$ and not greater than $T(1)$, and the step of driving the high-pressure fuel pump to inject the fuel at high pressure when the fuel temperature T is greater than $T(1)$.

25 Claims, 5 Drawing Sheets

CONTROL DEVICE OF FUEL SYSTEM OF INTERNAL COMBUSTION ENGINE

This nonprovisional application is based on Japanese Patent Application No. 2005-197833 filed with the Japan Patent Office on Jul. 6, 2005, the entire contents of which are hereby incorporated by reference.

BACKGROUND OF THE INVENTION

1. Field of the Invention

The present invention relates to a control device of a fuel system of an internal combustion engine that includes a fuel injection mechanism (in-cylinder injector) for injecting fuel into a cylinder at a high pressure, or an internal combustion engine that includes, in addition to the above fuel injection mechanism, another fuel injection mechanism (intake manifold injector) for injecting fuel into an intake manifold or an intake port. More particularly, the present invention relates to a technique of controlling the fuel system during idling of the internal combustion engine.

2. Description of the Background Art

An engine having a first fuel injection valve (in-cylinder injector) for injecting fuel into a combustion chamber of a gasoline engine and a second fuel injection valve (intake manifold injector) for injecting fuel into an intake manifold, and changing a fuel injection ratio between the in-cylinder injector and the intake manifold injector in accordance with the engine speed or the load of the internal combustion engine is known. A direct injection engine having only a fuel injection valve (in-cylinder injector) for injecting fuel into a combustion chamber of a gasoline engine is also known. In a high-pressure fuel system including the in-cylinder injector, the fuel having its pressure increased by a high-pressure fuel pump is supplied via a delivery pipe to the in-cylinder injector, which injects the high-pressure fuel into a combustion chamber of each cylinder of the internal combustion engine.

Further, a diesel engine having a common rail fuel injection system is also known. In the common rail fuel injection system, the fuel having its pressure increased by a high-pressure fuel pump is stored in a common rail, and injected from the common rail into a combustion chamber of each cylinder of the diesel engine according to opening/closing of an electromagnetic valve.

To obtain the fuel of a high pressure in such internal combustion engines, a high-pressure fuel pump is used which has a cylinder driven by a cam provided at a driveshaft that is connected to a crankshaft of the internal combustion engine. The high-pressure fuel pump includes a pump plunger that moves in a reciprocating manner in the cylinder by rotation of the cam, and a pressurizing chamber formed with the cylinder and the pump plunger. Various pipes are connected to the pressurizing chamber, which include a pump supply pipe that is in communication with a feed pump feeding fuel from a fuel tank, a return pipe provided to cause the fuel to flow out of the pressurizing chamber to return to the fuel tank, and a high-pressure delivery pipe provided to deliver the fuel within the pressurizing chamber to the in-cylinder injector. An electromagnetic spill valve is provided at the high-pressure fuel pump, which opens/closes a path between the pressurizing chamber and the pump supply pipe and the high-pressure delivery pipe.

In the state where the electromagnetic spill valve is open, when the pump plunger moves in the direction increasing the volume of the pressurizing chamber, i.e., when the high-pressure fuel pump is in the suction stroke, the fuel is suctioned from the pump supply pipe into the pressurizing chamber. When the pump plunger moves in the direction decreasing the volume of the pressurizing chamber, i.e., when the electromagnetic spill valve is closed in the state where the high-pressure fuel pump is in the delivery stroke, the path from the pressurizing chamber to the pump supply pipe and the return pipe is shut off, so that the fuel within the pressurizing chamber is delivered via the high-pressure delivery pipe to the in-cylinder injector.

In such a high-pressure fuel pump, the fuel is delivered to the in-cylinder injector only during the valve closing period of the electromagnetic spill valve in the delivery stroke, so that the amount of the delivered fuel is adjusted by controlling the valve closing start timing of the electromagnetic spill valve (i.e., by adjusting the valve closing period of the electromagnetic spill valve). More specifically, when the valve closing period is elongated by advancing the valve closing start timing of the electromagnetic spill valve, the amount of the fuel delivered increases. In contrast, when the valve closing period is shortened by delaying the valve closing start timing of the electromagnetic spill valve, the amount of the fuel delivered decreases.

As such, when the fuel fed from the feed pump is pressurized by the high-pressure fuel pump and the pressurized fuel is delivered to the in-cylinder injector, the fuel injection can be carried out accurately even in the case of the internal combustion engine directly injecting fuel into the combustion chamber.

In the delivery stroke of this high-pressure fuel pump, the electromagnetic spill valve is closed during the process where the volume of the pressurizing chamber is being reduced. Thus, the fuel tries to flow not only to the high-pressure delivery pipe side, but also to the return pipe side. When the electromagnetic spill valve is closed in this state, the force of the fuel trying to flow in the above-described manner will be applied to the valve closing operation, which results in a large impact force upon closing the electromagnetic spill valve. With such an increase of the impact, the actuation sound of the electromagnetic spill valve (the sound when the valve is closed) increases, and such actuation sound of the electromagnetic spill valve will be generated continuously each time the electromagnetic spill valve is closed.

In the normal operation mode of the internal combustion engine, the actuation sound of the internal combustion engine such as the sound of combustion of the air-fuel mixture is large, and thus, the continuous actuation sound that occurs every time the electromagnetic spill valve is closed would not be large enough to make the driver feel uncomfortable. However, in the idle operation mode of the internal combustion engine or the like where the actuation sound of the internal combustion engine in itself is small, the continuous actuation sound of the electromagnetic spill valve becomes relatively large, in which case the uncomfortable feeling caused by such actuation sound would not be negligible.

Japanese Patent Laying-Open No. 2001-041088 discloses a control device for a fuel pump capable of lowering continuous actuation sound caused each time an electromagnetic spill valve is closed. The control device disclosed therein includes a fuel pump varying the volume of a pressurizing chamber based on relative movement of a cylinder and a pump plunger as a result of rotation of a cam, so as to suction fuel into the pressurizing chamber, and also delivering the fuel to a fuel injection valve of the internal combustion engine, and a spill valve opening and closing a portion between the pressurizing chamber and a spill path for flow-out of the fuel from the pressurizing chamber. According to the control device for a fuel pump, an amount of fuel delivery from the fuel pump to the fuel injection valve is regulated by controlling a valve closing duration of the spill valve. The control device includes a control unit for controlling the spill valve based on an operation state of the internal combustion engine so as to adjust the number of times of fuel delivery by the fuel pump during a prescribed period, so that the number of times of fuel injection from the fuel injection valve per one fuel delivery is changed, i.e., the number of times of fuel injection per one fuel delivery is decreased while the engine is in a low load state.

According to this control device for a fuel pump, the number of times of fuel injection per one fuel delivery is decreased while the engine is in a low load state during which continuous actuation sound of the electromagnetic spill valve is relatively high. Therefore, an amount of the fuel delivered in one fuel delivery can be small. Accordingly, the valve closing start timing of the electromagnetic spill valve can further be closer to the top dead center. As it approaches the top dead center, the cam speed indicating the relative movement amount of the pump plunger and the cylinder is reduced. With such reduction of the cam speed at the time of closing of the electromagnetic spill valve, the sound produced when the electromagnetic spill valve is closed can further be lowered. By lowering the sound produced when the electromagnetic spill valve is closed, continuous actuation sound caused each time the electromagnetic spill valve is closed is lowered.

Further, Japanese Patent National Publication No. 2003-513193 discloses a device for reliably supplying fuel to an internal combustion engine provided with a high-pressure fuel pump and a low-pressure fuel pump, so that vaporization of the fuel within the high-pressure fuel pump is surely avoided at all the operating points. In this device, the actual fuel temperature within the high-pressure fuel pump is detected, and a lowest possible pre-pressure that can reliably avoid the vaporization of the fuel within the high-pressure fuel pump is determined depending on the actual fuel temperature, and the low-pressure fuel pump is controlled so as to generate the thus obtained pre-pressure.

According to this device, the pre-pressure can be controlled depending on the actual fuel temperature within the high-pressure fuel pump, which can reliably avoid atomization of the fuel within the high-pressure fuel pump at any time. The pre-pressure may be selected on occasions, depending on the fuel temperature obtained at that time point, to be high enough to surely avoid atomization of the fuel within the high-pressure fuel pump.

Furthermore, Japanese Patent Laying-Open No. 2002-061529 discloses a fuel supply device of an internal combustion engine that can quickly obtain a high fuel pressure required for fuel injection at the time of startup of a cylinder injection type internal combustion engine when it is not possible to increase the discharge pressure of a high-pressure fuel pump. This fuel supply device includes a low-pressure fuel pump that discharges fuel within a fuel tank to a fuel pipe, a regulator that controls fuel on the low pressure side, discharged from the low-pressure fuel pump, to a predetermined fuel pressure, and a high-pressure fuel pump that further increases the pressure of the fuel pressure-controlled by the regulator, and discharges the fuel to an injector. At the time of startup of the internal combustion engine, the fuel pressure on the low pressure side is increased to a level greater than a predetermined pressure.

According to this fuel supply device of an internal combustion engine, at the time of startup of the internal combustion engine, the fuel pressure on the low pressure side is increased. Even in the case where the high-pressure fuel pump driven by the internal combustion engine cannot ensure a high pressure at the time of startup due to insufficient engine speed, the discharge pressure of the high-pressure fuel pump attains a high pressure rapidly, with the increased fuel pressure on the low pressure side added thereto, so that favorable starting capability is realized.

With the control device disclosed in Japanese Patent Laying-Open No. 2001-041088, however, the high-pressure fuel pump would not stop at the engine low load state (i.e., the electromagnetic spill valve remains open). Thus, there still occurs the actuation sound when the electromagnetic spill valve of the high-pressure fuel pump is closed, although the sound is reduced to some extent.

At the low load state (during idling) of the internal combustion engine, it may be conceivable to stop the high-pressure fuel pump and inject fuel with the low-pressure fuel pump (at a normal feed pressure) so as to avoid generation of the actuation sound and at the same time to prevent accumulation of deposits in the injection hole of the in-cylinder injector.

When the fuel is supplied to the in-cylinder injector at such a normal feed pressure, however, the pressure of the fuel in the delivery pipe would decrease. Since the delivery pipe is provided in the vicinity of the cylinder head, it receives heat from the internal combustion engine, and thus, the fuel temperature within the delivery pipe is increased. That is, the pressure of the fuel within the delivery pipe decreases and, at the same time, the fuel temperature increases, so that the fuel is likely to be vaporized, and vapors (vaporized fuel components) tend to be generated within the delivery pipe. When the fuel is injected from the in-cylinder injector in the state where the vapors are generated within the delivery pipe, the fuel injection amount becomes unstable, leading to unstable air-fuel ratio control.

With regard to such a problem, according to Japanese Patent National Publication No. 2003-513193, the pre-pressure of the low-pressure fuel pump is increased. However, it merely avoids atomization of the fuel within the high-pressure fuel pump to ensure normal operation of the high-pressure fuel pump. It does not solve the problem of the actuation sound of the high-pressure fuel pump that is considerable particularly during idling, or the problem that the operation of the internal combustion engine becomes unstable during idling.

Further, according to Japanese Patent Laying-Open No. 2002-061529, although the discharge pressure of the low-pressure fuel pump is increased, it is difficult to increase the discharge pressure of the high-pressure fuel pump of an engine driven type at the time of startup of the internal combustion engine. Thus, again, it does not solve the problem of the actuation sound of the high-pressure fuel pump that is considerable particularly during idling, or the problem that the operation of the internal combustion engine becomes unstable during idling.

SUMMARY OF THE INVENTION

In view of the foregoing, an object of the present invention is to provide a control device of a fuel system of an internal combustion engine capable of suppressing actuation sound of a high-pressure fuel pump during idling of the internal combustion engine and at the same time realizing stable operation of the internal combustion engine.

A control device according to the present invention controls a fuel system of an internal combustion engine including a low-pressure pump supplying fuel from a fuel tank to a fuel injection mechanism and a high-pressure pump provided between the low-pressure pump and the fuel injection mechanism and increasing pressure of the supplied fuel. The control device includes: a detection portion detecting that an operation state of the internal combustion engine is an idle operation state; a fuel state detection portion detecting a state of fuel in a pipe connecting the high-pressure pump and the fuel injection mechanism; and a control portion controlling the low-pressure pump and the high-pressure pump. The control portion controls the high-pressure pump and the low-pressure pump such that, when the idle operation state is detected, pressure of the fuel discharged from the high-pressure pump and pressure of the fuel discharged from the low-pressure pump are adjusted based on the state of the fuel in the pipe.

According to this invention, the pipe connecting the high-pressure pump and the fuel injection mechanism suffers heat from the internal combustion engine, and thus, the temperature of the fuel in the pipe tends to be high. For example, in the idle operation state where mechanical noise caused by the high-pressure pump that increases the fuel pressure using the driving force of the internal combustion engine is considerable, the generation of the mechanical noise may be suppressed by stopping the increase of the fuel pressure by the high-pressure pump. If the fuel is supplied to the fuel injection mechanism using the low-pressure pump instead of the high-pressure pump, however, vapors will be generated in the pipe when the fuel temperature is high, in which case a proper fuel injection amount may not be ensured. Thus, the control portion controls the high-pressure pump and the low-pressure pump based on the state of vaporization of the fuel in the pipe, by changing the control manner in association with the increase of the degree of vaporization, such that the pressure of the fuel is not increased by the high-pressure pump or the low-pressure pump, such that the pressure of the fuel is increased by the low-pressure pump but not by the high-pressure pump, or such that the pressure of the fuel is increased by the high-pressure pump. With this configuration, at the time when the high-pressure pump is stopped to suppress generation of actuation sound, generation of vapors in the pipe is prevented as well, ensuring stable combustion. As a result, it is possible to provide a control device of a fuel system of an internal combustion engine that can suppress the actuation sound of the high-pressure fuel pump during idling of the internal combustion engine and that can also implement stable operation of the internal combustion engine.

Preferably, the fuel state detection portion detects a state of vaporization of the fuel in the pipe.

According to this invention, the state of vaporization of the fuel in the pipe connecting the high-pressure pump and the fuel injection mechanism is detected, and it is controlled such that the pressure of the fuel in the pipe is increased as the degree of vaporization is larger, while the pressure of the fuel in the pipe is decreased as the degree of vaporization is smaller, to thereby suppress the actuation sound of the high-pressure pump and prevent unstable combustion due to the generation of the vapors.

Further preferably, the fuel state detection portion detects the state of vaporization based on at least one of a temperature of the internal combustion engine, a temperature of the fuel in the pipe, an engine speed of the internal combustion engine, and a load of the internal combustion engine.

According to this invention, the pipe receives more heat as the temperature of the internal combustion engine is higher, the engine speed of the internal combustion engine is faster, or the load of the internal combustion engine is greater, for example, so that the temperature of the fuel in the pipe increases. The state of vaporization can be detected by estimating the temperature of the fuel in the pipe from the operation state of the internal combustion engine. It is noted that the detection of the state of vaporization in this case includes the case of detecting the state of vaporization by estimation (the same applies hereinbelow).

Further preferably, the fuel state detection portion detects the state of vaporization based on a continuation time of the operation state determined by at least one of a temperature of the internal combustion engine, a temperature of the fuel in the pipe, an engine speed of the internal combustion engine, and a load of the internal combustion engine.

According to this invention, the time during which the pipe suffers more heat becomes longer as the state where the temperature of the internal combustion engine is high continues longer, the state where the engine speed of the internal combustion engine is fast continues longer, or the state where the load of the internal combustion engine is great continues longer, for example, so that the temperature of the fuel in the pipe increases. The state of vaporization can be detected by estimating the temperature of the fuel in the pipe from the elapsed time of the operation state of the internal combustion engine.

Further preferably, the control portion controls the high-pressure pump such that, in the state where the degree of vaporization of the fuel in the pipe is large, the pressure of the fuel discharged from the high-pressure pump is increased.

According to this invention, when the degree of vaporization of the fuel in the pipe is large, stabilization of combustion can be given higher priority than suppression of the actuation sound of the high-pressure pump. To this end, the pressure of the fuel discharged from the high-pressure pump can be increased to prevent generation of vapors.

Further preferably, the control portion controls the high-pressure pump and the low-pressure pump such that, in the state where the degree of vaporization of the fuel in the pipe is small, an increase of the pressure of the fuel discharged from the high-pressure pump is stopped and the pressure of the fuel discharged from the low-pressure pump is adjusted in accordance with the degree of vaporization.

According to this invention, when the degree of vaporization of the fuel in the pipe is small, the high-pressure pump is stopped to suppress the actuation sound of the high-pressure pump. At this time, in order to stabilize the combustion, the pressure of the fuel discharged from the low-pressure pump is adjusted in accordance with the degree of vaporization. Specifically, even in the state where the degree of vaporization of the fuel in the pipe is not large, if the degree of vaporization is relatively high, the pressure of the fuel discharged from the low-pressure pump can be increased so as to prevent generation of vapors.

Further preferably, the control portion controls the low-pressure pump such that, in the state where the degree of vaporization of the fuel in the pipe is small, the pressure of the fuel discharged from the low-pressure pump is increased when the degree of vaporization is higher than when the degree of vaporization is lower.

According to this invention, even when the degree of vaporization of the fuel in the pipe is not so large, if the degree of vaporization is relatively high, the pressure of the fuel discharged from the low-pressure pump can be increased to prevent generation of vapors, whereas if the degree of vaporization is low, the pressure of the fuel discharged from the low-pressure pump is not increased, to thereby ensure stable combustion.

Further preferably, a low-pressure fuel pipe system including the low-pressure pump is formed in the fuel system, and the low-pressure fuel pipe system is configured to allow adjustment of the pressure of the fuel in the pipe.

According to this invention, the pressure of the fuel discharged from the low-pressure pump can be increased, e.g., by increasing the discharge pressure of the low-pressure pump, or by increasing the discharge amount of the low-pressure pump.

Further preferably, the low-pressure pump is a pump having a discharge amount controllable, and the control portion adjusts the pressure of the fuel in the pipe in the low-pressure fuel pipe system by a mechanism that changes pressure depending on a flow rate.

According to this invention, the pressure of the fuel discharged from the low-pressure pump can be increased, e.g., by changing the set pressure of a pressure regulator, which is an example of the mechanism that changes the pressure depending on the flow rate.

Further preferably, the mechanism is a pressure regulator that increases the pressure with an increase of the flow rate.

According to this invention, the pressure of the fuel discharged from the low-pressure pump can be increased, e.g., by changing the set pressure of the pressure regulator that increases the pressure as the flow rate increases.

Further preferably, the control portion adjusts the pressure of the fuel in the pipe in the low-pressure fuel pipe system by a variable pressure regulator.

According to this invention, the pressure of the fuel discharged from the low-pressure pump can be changed (increased) by controlling the variable pressure regulator.

Further preferably, the fuel injection mechanism is a first fuel injection mechanism injecting fuel into a cylinder, and the internal combustion engine further includes a second fuel injection mechanism injecting fuel into an intake manifold.

According to this invention, not only in the internal combustion engine having solely the first fuel injection mechanism injecting fuel into a cylinder, but also in the internal combustion having both the first fuel injection mechanism injecting fuel into a cylinder and the second fuel injection mechanism injecting fuel into an intake manifold, the actuation sound of the high-pressure fuel pump during idling of the internal combustion engine can be suppressed, and stable operation of the internal combustion engine can also be realized.

Further preferably, the first fuel injection mechanism is an in-cylinder injector, and the second fuel injection mechanism is an intake manifold injector.

According to this invention, in the internal combustion engine having an in-cylinder injector that is the first fuel injection mechanism and an intake manifold injector that is the second fuel injection mechanism, and using both injectors for fuel injection as appropriate, it is possible to suppress actuation sound of the high-pressure fuel pump during idling of the internal combustion engine and also realize stable operation of the internal combustion engine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings. The same elements have the same reference characters allotted. Their labels and functions are also identical. Therefore, detailed description thereof will not be repeated.

Figure 1:
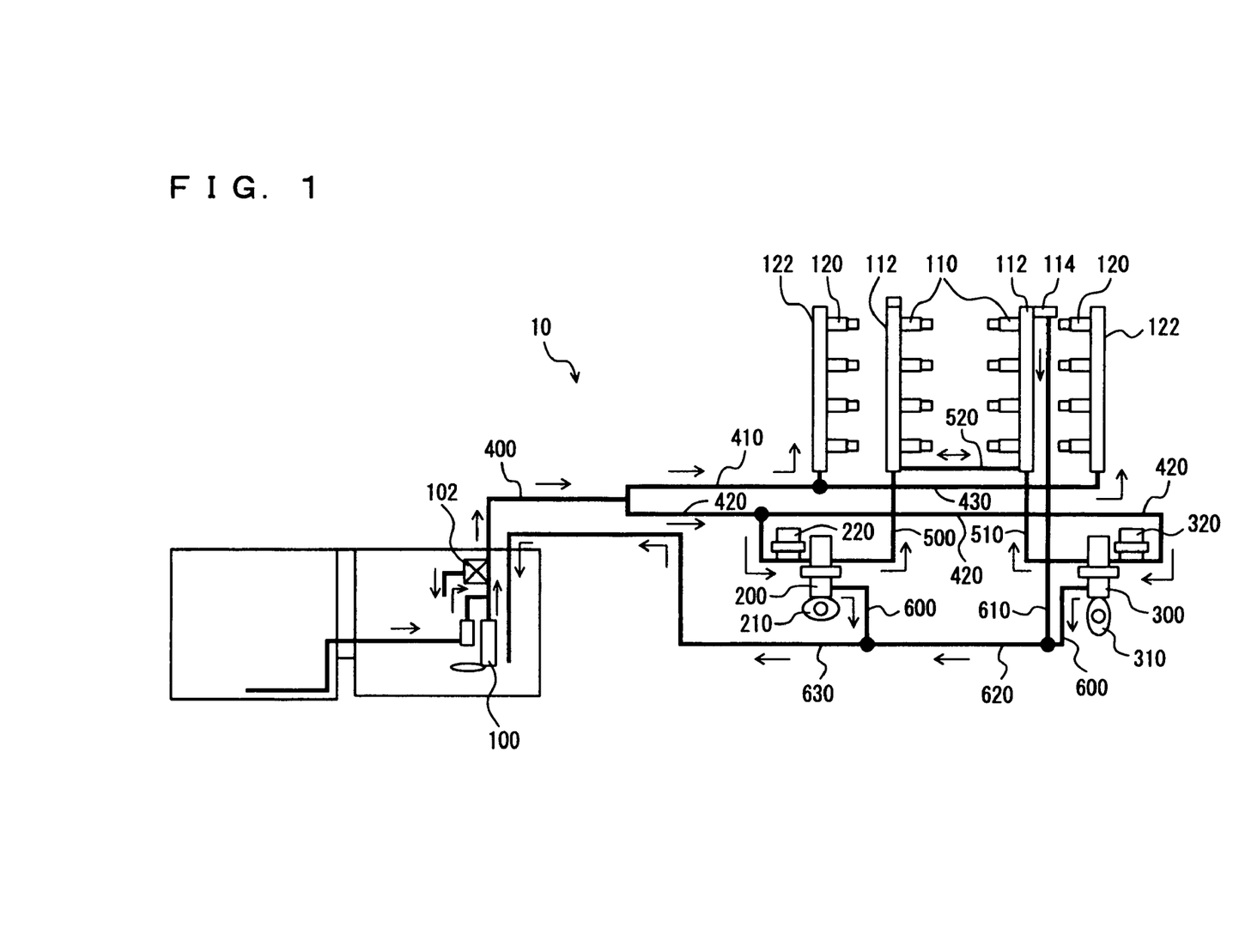
FIG. 1 is an overall schematic view of a fuel supply system of a gasoline engine controlled by a control device according to an embodiment of the present invention.

FIG. 1 shows a fuel supply system 10 of an engine controlled by an engine ECU (Electronic Control Unit) that is the control device according to an embodiment of the present invention. The engine is a V-type 8-cylinder gasoline engine, and has in-cylinder injectors 110 for injecting the fuel into the respective cylinders, and intake manifold injectors 120 for injecting the fuel into intake manifolds of the respective cylinders. It is noted that the present invention is not applied exclusively to such an engine, but is applicable to any engine having at least in-cylinder injectors 110 for injecting the fuel into the cylinders. It is also applicable to a gasoline engine of another type (including V-type 6-cylinder, in-line 6-cylinder, in-line 4-cylinder) and a common rail diesel engine. Further, the number of the high-pressure fuel pumps is not restricted to two, but may be any number at least one.

As shown in FIG. 1, this fuel supply system 10 includes a feed pump 100 arranged in a fuel tank and for supplying fuel at a discharge pressure of low pressure (set pressure of a pressure regulator 102), a first high-pressure fuel pump 200 driven by a first cam 210, a second high-pressure fuel pump 300 driven by a second cam 310 having a discharge phase different from that of first cam 210, a high-pressure delivery pipe 112 provided for each of left and right banks and for supplying high-pressure fuel to in-cylinder injectors 110, four in-cylinder injectors 110 for each of the left and right banks, provided at the corresponding high-pressure delivery pipe 112, a low-pressure delivery pipe 122 provided for each of the left and right banks and for supplying fuel to intake manifold injectors 120, and four intake manifold injectors 120 for each of the left and right banks, provided at the corresponding low-pressure delivery pipe 122.

A pressure regulator 102 is provided at the discharge port of feed pump 100 in the fuel tank. Pressure regulator 102 is connected to the engine ECU, which can change the set pressure of pressure regulator 102. The set pressure may be from 300 kPa to 700 kPa, for example. When the pressure of the fuel discharged from feed pump 100 attains a level equal to or greater than the level set by pressure regulator 102, the fuel corresponding to the excess pressure is returned to the fuel tank as the relief fuel. Since pressure regulator 102 is provided within the fuel tank to obtain such relief fuel, the fuel heated as it passes through the engine room will not return to the fuel tank, so that generation of evaporation gas within the fuel tank is suppressed. It is noted that pressure regulator 102 may be provided at the distal end of low-pressure delivery pipe 122, instead of being provided within the fuel tank.

The discharge port of feed pump 100 in the fuel tank is connected to a low-pressure supply pipe 400, which is branched into a first low-pressure delivery connection pipe 410 and a pump supply pipe 420. First low-pressure delivery connection pipe 410 is branched to low-pressure delivery pipe 122 of one of the V-shaped banks, and on the downstream of that branch point, it forms a second low-pressure delivery connection pipe 430, which is connected to low-pressure delivery pipe 122 of the other bank.

Pump supply pipe 420 is connected to intake ports of first and second high-pressure fuel pumps 200 and 300. A first pulsation damper 220 and a second pulsation damper 320 are provided immediately upstream of the intake ports of first and second high-pressure fuel pumps 200 and 300, respectively, so as to reduce fuel pulsation.

The discharge port of first high-pressure fuel pump 200 is connected to a first high-pressure delivery connection pipe 500, which is connected to high-pressure delivery pipe 112 of one of the V-shaped banks. The discharge port of second high-pressure fuel pump 300 is connected to a second high-pressure delivery connection pipe 510, which is connected to high-pressure delivery pipe 112 of the other bank. High-pressure delivery pipe 112 of one bank and high-pressure delivery pipe 112 of the other bank are connected via a high-pressure connection pipe 520.

A relief valve 114 provided at high-pressure delivery pipe 112 is connected via a high-pressure delivery return pipe 610 to a high-pressure fuel pump return pipe 600. The return ports of high-pressure fuel pumps 200 and 300 are connected to high-pressure fuel pump return pipe 600. High-pressure fuel pump return pipe 600 is connected to return pipes 620 and 630, and then connected to the fuel tank.

Figure 2:
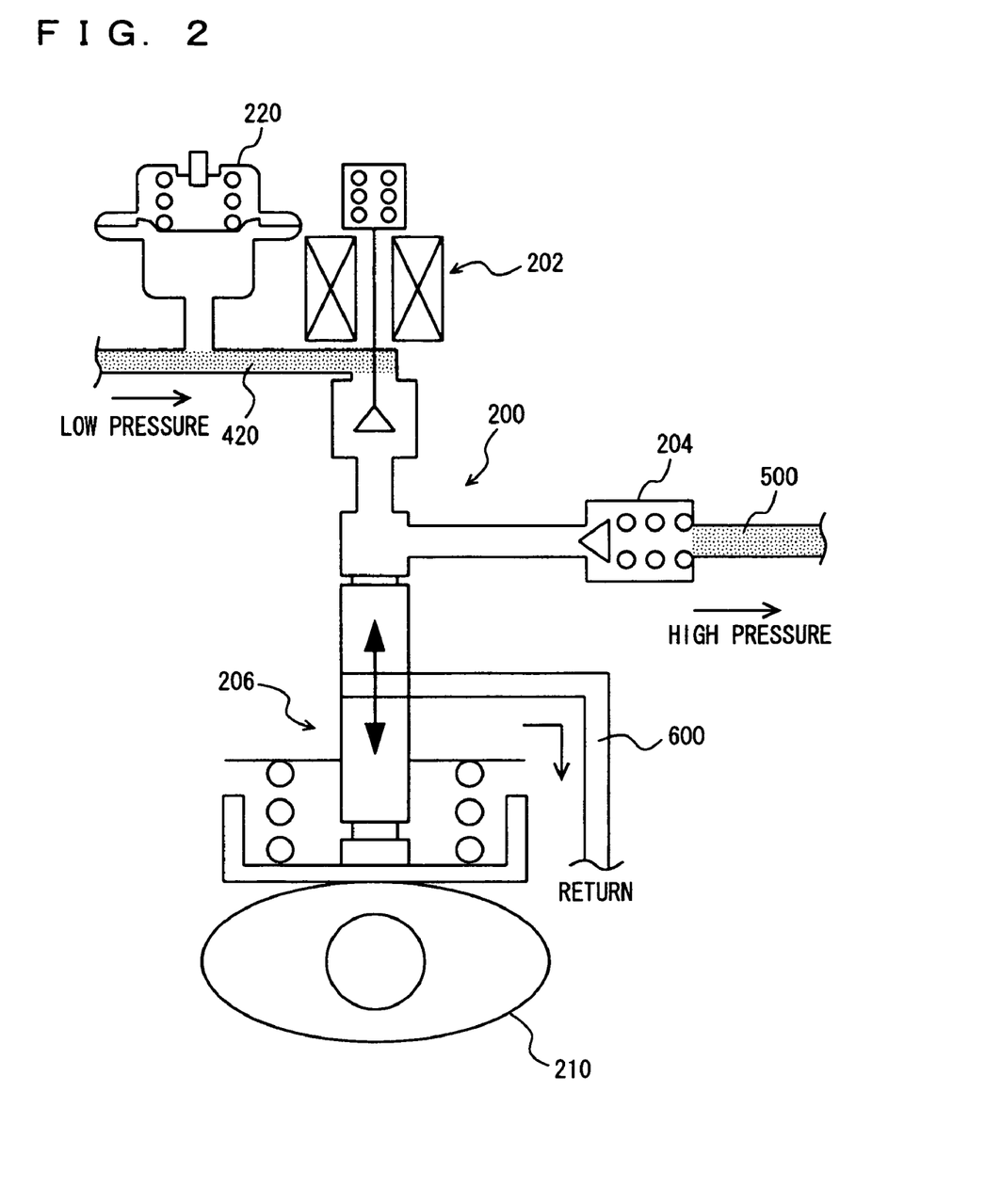
FIG. 2 is a partially enlarged view of FIG. 1.

FIG. 2 is an enlarged view of first high-pressure fuel pump 200 and its surroundings in FIG. 1. Although second high-pressure fuel pump 300 has the similar configuration, they are different in phase of the cams and hence different in phase of the discharge timings, thereby suppressing occurrence of pulsation. First and second high-pressure fuel pumps 200 and 300 may have characteristics similar to or different from each other. In the following explanation, it is assumed that first high-pressure fuel pump 200 and second high-pressure fuel pump 300 have discharge capabilities that are the same in specification, although their control characteristics differ from each other due to the individual differences.

High-pressure fuel pump 200 has, as its main components, a pump plunger 206 driven by a cam 210 to slide up and down, an electromagnetic spill valve 202, and a check valve 204 provided with a leakage function.

When pump plunger 206 is moved downward by cam 210 and while electromagnetic spill valve 202 is open, the fuel is introduced (suctioned). When pump plunger 206 is moved upward by cam 210, the timing to close electromagnetic spill valve 202 is changed to control the amount of the fuel discharged from high-pressure fuel pump 200. During the pressurizing stroke in which pump plunger 206 is moved upward, the fuel of a greater amount is discharged as the timing to close electromagnetic spill valve 202 is earlier, whereas the fuel of a fewer amount is discharged as the timing to close the valve is later. The drive duty of electromagnetic spill valve 202 when the greatest amount of fuel is discharged is set to 100%, and the drive duty of electromagnetic spill valve 202 when the smallest amount of fuel is discharged is set to 0%. When the drive duty is 0%, electromagnetic spill valve 202 remains open, in which case, although pump plunger 206 slides up and down as long as first cam 210 continues to rotate (along with rotation of the engine), the fuel is not pressurized because electromagnetic spill valve 202 does not close.

The pressurized fuel presses and opens check valve 204 provided with the leakage function (of the set pressure of about 60 kPa), and the fuel is delivered via first high-pressure delivery connection pipe 500 to high-pressure delivery pipe 112. At this time, the fuel pressure is controlled in a feedback manner by a fuel pressure sensor provided at high-pressure delivery pipe 112. High-pressure delivery pipes 112 at the respective banks are connected via high-pressure connection pipe 520, as described above.

Check valve 204 with the leakage function is a check valve of a normal type but provided with pores that are always open. When the fuel pressure within first high-pressure fuel pump 200 (pump plunger 206) becomes lower than the fuel pressure within first high-pressure delivery connection pipe 500 (for example, when the engine and hence cam 210 stops while electromagnetic spill valve 202 remains open), the high-pressure fuel within first high-pressure delivery connection pipe 500 returns through the pores back to the high-pressure fuel pump 200 side, thereby lowering the fuel pressure within high-pressure delivery connection pipe 500 as well as within high-pressure delivery pipe 112. As such, at the time of stop of the engine, for example, the fuel within high-pressure delivery pipe 112 is not at a high pressure, so that leakage of the fuel from in-cylinder injectors 110 is prevented.

The engine ECU drives in-cylinder injector 110 based on the ultimate fuel injection amount to control the amount of the fuel injected from in-cylinder injector 110. Such an amount of the fuel injected from in-cylinder injector 110 (i.e., fuel injection amount thereof) is determined according to the fuel pressure within high-pressure delivery pipe 112 and the fuel injection time, so that it is necessary to maintain the fuel pressure at a proper value so as to regulate the fuel injection amount to a proper level. Accordingly, the engine ECU performs feedback control of the fuel discharge amount of high-pressure fuel pump 200 to maintain fuel pressure P at a proper value so that the fuel pressure obtained based on the detection signal from the fuel pressure sensor approaches the target fuel pressure set in accordance with the engine operation state. It is noted that the fuel discharge amount of high-pressure fuel pump 200 is controlled in a feedback manner by adjusting the valve closing period (valve closing start timing) of the electromagnetic spill valve based on a duty ratio DT, which will now be described.

Hereinafter, description is made about the duty ratio DT, which is the controlled variable for controlling the fuel discharge amount of high-pressure fuel pump 200 (or, the valve closing start timing of electromagnetic spill valve 202). Duty ratio DT, which can take any value from 0% to 100%, is a value that relates to the cam angle of cam 210 corresponding to the valve closing period of electromagnetic spill valve 202. More specifically, when the cam angle (maximum cam angle) corresponding to the maximum valve closing period of electromagnetic spill valve 202 is represented as "$\theta(0)$" and the cam angle (target cam angle)

corresponding to the target value of the valve closing period is represented as "θ", duty ratio DT indicates a ratio of target cam angle θ to maximum cam angle θ(0). Thus, duty ratio DT approaches 100% as the target valve closing period (valve closing start timing) of electromagnetic spill valve 202 approaches the maximum valve closing period, while it approaches 0% as the target valve closing period approaches "0".

As duty ratio DT approaches 100%, the valve closing start timing of electromagnetic spill valve 202 adjusted based on duty ratio DT is made earlier, so that the valve closing period of electromagnetic spill valve 202 is elongated. As a result, the fuel discharge amount of high-pressure fuel pump 200 and hence fuel pressure P increases. As duty ratio DT approaches 0%, the valve closing start timing of electromagnetic spill valve 202 adjusted based on duty ratio DT is delayed, so that the valve closing period of electromagnetic spill valve 202 is shortened. As a result, with the decrease of the fuel discharge amount of high-pressure fuel pump 200, fuel pressure P decreases.

It is noted that control of high-pressure fuel pump 200 is not limited to the control using duty ratio DT. Instead of controlling the timing to close the valve (electromagnetic spill valve) indirectly by using duty ratio DT, the angle of the crankshaft satisfying a discharge amount required for high-pressure fuel pump 200 may be calculated based on the required discharge amount, so as to directly control electromagnetic spill valve 202 to close when the angle of the crankshaft reaches the calculated angle. When calculating the angle of the crankshaft satisfying the discharge amount required for high-pressure fuel pump 200 based on the required discharge amount, the engine speed and the pressure of the high-pressure fuel are taken into consideration. Such use of the required discharge amount for control improves controllability at the time when the engine speed or the pressure of the high-pressure fuel varies, compared to the case of the feedback control using solely the duty ratio as in the conventional case.

Figure 3:
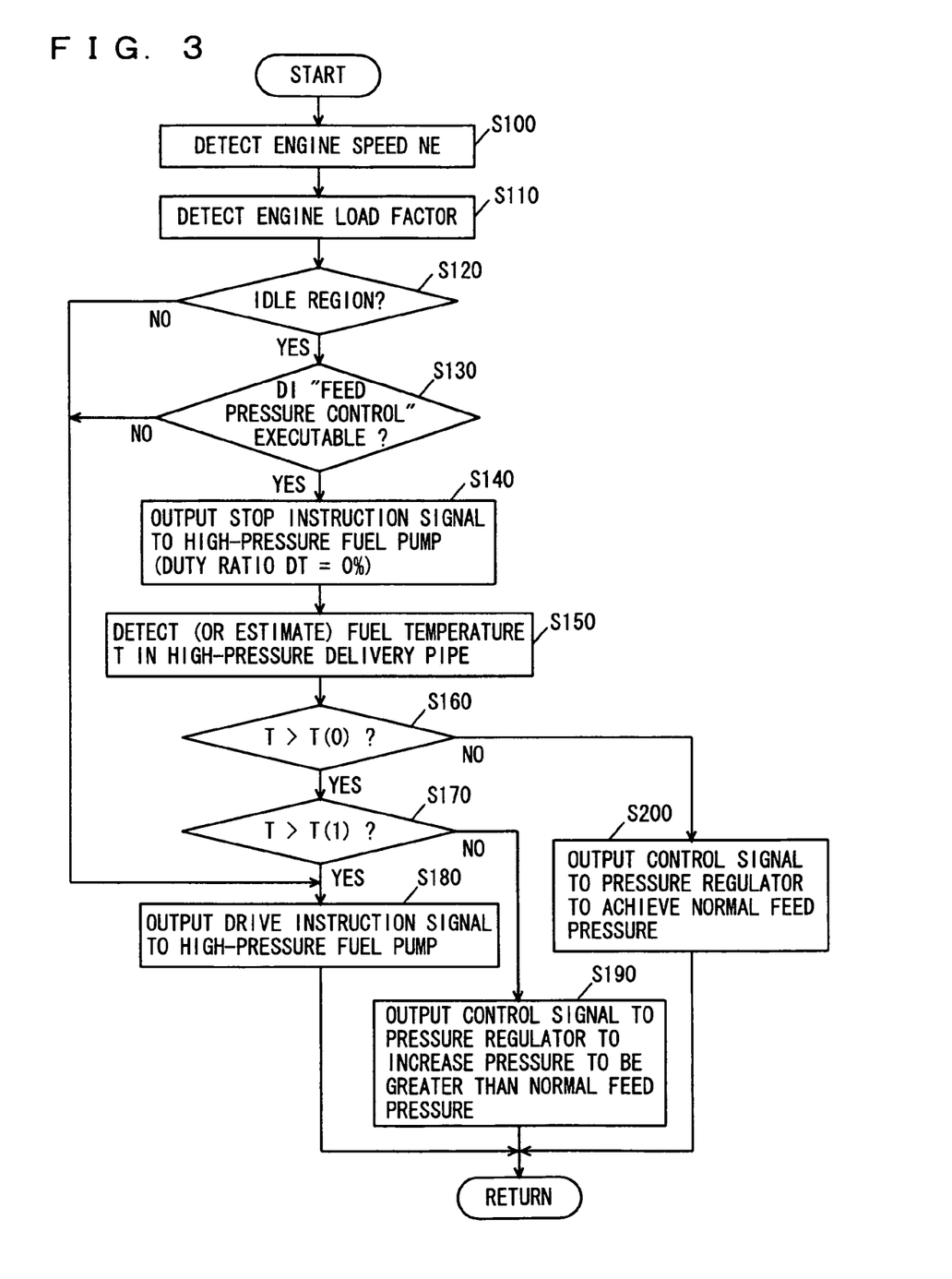
FIG. 3 is a flowchart illustrating a control structure of a program that is executed by an engine ECU.

Hereinafter, a control structure of a program executed by the engine ECU that is the control device according to the present embodiment will be described with reference to FIG. 3.

In step (hereinafter, abbreviated as "S") 100, the engine ECU detects an engine speed NE based on a signal from the engine speed sensor. In S110, the engine ECU detects a load factor of the engine based on a signal from the accelerator sensor. The load factor of the engine is not restricted to the one determined solely by the position of the accelerator pedal.

In S120, the engine ECU determines whether the engine operation region is currently an idle region or not, based on the detected engine speed NE, the load factor, and a predetermined map and others. If it is determined that the engine operation region is currently the idle region (YES in S120), the process proceeds to S130. If not (NO in S120), the process proceeds to S180.

In S130, the engine ECU determines whether it is possible to perform "feed pressure control" to cause in-cylinder injector 110 to inject fuel at a normal feed pressure. For example, in the state where deposits are accumulated in the injection hole of in-cylinder injector 110, it is determined that the "feed pressure control" is not possible, taking account of blowing off the deposits with high-pressure fuel or the like. If it is possible to perform the "feed pressure control" to cause in-cylinder injector 110 to inject the fuel at the normal feed pressure (YES in S130), the process proceeds to S140. If not (NO in S130), the process proceeds to S180.

In S140, the engine ECU outputs a stop instruction signal to high-pressure fuel pumps 200, 300. More specifically, it outputs a control signal indicating duty ratio DT of 0% of electromagnetic spill valve 202.

In S150, the engine ECU detects or estimates a temperature T of the fuel in high-pressure delivery pipe 112. For the estimation, the engine temperature, the coolant temperature, the operating state of the engine, and the continuation time of the operating state may be employed. Further, since it is desired to ultimately estimate the degree of vaporization of the fuel within high-pressure delivery pipe 112 from the temperature of the fuel, it may be configured to use these status quantities to directly estimate the degree of vaporization of the fuel.

In S160, the engine ECU determines whether temperature T of the fuel within high-pressure delivery pipe 112 is higher than a predetermined first threshold value T(0). If temperature T of the fuel within high-pressure delivery pipe 112 is higher than predetermined first threshold value T(0) (YES in S160), the process proceeds to S170. If not (NO in S160), the process proceeds to S200.

In S170, the engine ECU determines whether temperature T of the fuel within high-pressure delivery pipe 112 is higher than a predetermined second threshold value T(1) (T(0)<T(1)). If temperature T of the fuel within high-pressure delivery pipe 112 is higher than predetermined second threshold value T(1) (YES in S170), the process proceeds to S180. If not (NO in S170), the process proceeds to S190.

In S180, the engine ECU outputs a drive instruction signal to high-pressure fuel pumps 200, 300. More specifically, it outputs a control signal indicating duty ratio DT of other than 0% of electromagnetic spill valve 202.

In S190, the engine ECU outputs a control signal to pressure regulator 102 to increase the fuel pressure to be greater than a normal feed pressure. As such, the pressure of the fuel supplied from feed pump 100 to in-cylinder injector 110 is increased.

It is noted that the method for increasing the pressure of the fuel within the pipe of the low-pressure fuel system such as low-pressure supply pipe 400 (i.e. the feed pressure increasing method) is not restricted to the method of controlling pressure regulator 102 as described above.

In S200, the engine ECU outputs a control signal to pressure regulator 102 to achieve the normal feed pressure.

Hereinafter, an operation of the internal combustion engine controlled by the engine ECU that is the control device of the present embodiment based on the above-described structure and flowchart will be described.

The engine speed NE and the engine load factor are detected (S100, S110), and if the operation region of the engine is currently the idle region (YES in S120), determination is made as to whether the "feed pressure control" to cause in-cylinder injector 110 to inject fuel at the normal feed pressure is possible or not (S130).

When the engine is currently in the idle region and the "feed pressure control" to cause in-cylinder injector 110 to inject the fuel at the normal feed pressure is possible (YES in S120 and YES in S130), high-pressure fuel pumps 200 and 300 are temporarily stopped (S140).

<When Fuel Temperature T is Relatively Low>

When temperature T of the fuel within high-pressure delivery pipe 112 is relatively low (NO in S160), the degree of vaporization of the fuel is small even if the pressure of the fuel within high-pressure delivery pipe 112 is decreased.

Thus, it is controlled such that the discharge pressure of feed pump 100 corresponds to a normal feed pressure. In doing so, generation of the actuation sound in high-pressure fuel pumps 200 and 300 can be prevented, and vapors would not be generated within high-pressure delivery pipe 112. Accordingly, it is possible to inject fuel of a desired amount from in-cylinder injector 110, which can prevent unstable fuel combustion.

<When Fuel Temperature T is Between T(0) and T(1)>

When temperature T of the fuel within high-pressure delivery pipe 112 is between T(0) and T(1) (YES in S160 and NO in S170), the degree of vaporization of the fuel becomes relatively high when the pressure of the fuel within high-pressure delivery pipe 112 decreases. Thus, it is controlled such that the discharge pressure from feed pump 100 is greater than the normal feed pressure. In doing so, generation of the actuation sound in high-pressure fuel pumps 200, 300 can be prevented, and vapors would not be generated in high-pressure delivery pipe 112. Accordingly, it is possible to inject fuel of a desired amount from in-cylinder injector 110, which can prevent unstable fuel combustion.

<When Fuel Temperature T is Relatively High>

When temperature T of the fuel within high-pressure delivery pipe 112 is relatively high (YES in S160 and YES in S170), the degree of vaporization of the fuel is large if the pressure of the fuel within high-pressure delivery pipe 112 decreases. Thus, high-pressure fuel pumps 200, 300 are driven to deliver high-pressure fuel to high-pressure delivery pipe 112. In doing so, although it is difficult to avoid generation of the actuation sound in high-pressure fuel pumps 200, 300, vapors would not be generated within high-pressure delivery pipe 112, so that it is possible to inject fuel of a desired amount from in-cylinder injector 110, and thus to prevent unstable combustion.

The method of increasing the feed pressure is not restricted to the method of changing the set pressure of pressure regulator 102 as described above. A capacity variable type pump (capable of varying discharge amount) may be used as the fuel pump to change the fuel discharge amount, and at the same time, a pressure regulator having the characteristic to increase the pressure with the increase of the flow rate may be used to increase the pressure of the fuel. Further, a capacity variable type pump (capable of varying discharge pressure) may be used as the fuel pump. In this case, for example, the rotational speed of the motor driving the pump may be controlled in a feedback manner such that the target pressure is obtained based on a signal from a pressure sensor detecting the feed pressure. Still further, a discharge amount, instead of the discharge pressure, may be used as the controlled variable for feedback control. It is noted that the feed pressure can be increased, regardless of the type of the fuel pump, as long as the pressure regulator of which set pressure can be controlled by the engine ECU as in the above-described embodiment is employed.

As described above, according to the engine ECU constituting the control device of the present embodiment, during idling, the actuation sound of the high-pressure fuel pump supplying high-pressure fuel to the in-cylinder injector can be prevented, and generation of vapors in the high-pressure pipe system can also be suppressed, to thereby realize stable combustion in the engine.

Engine (1) to which Present Control Device is Suitably Applied

An engine (1) to which the control device of the present embodiment is suitably applied will now be described.

Figure 4:
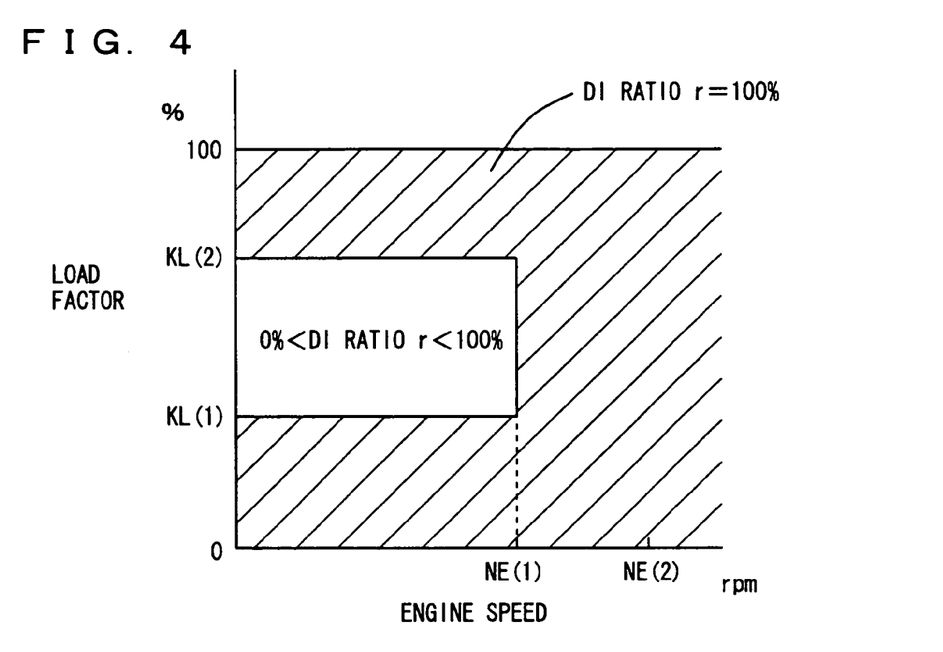
FIG. 4 shows a DI ratio map for a warm state of an engine (1) to which a control device according to an embodiment of the present invention is suitably applied.
Figure 5:
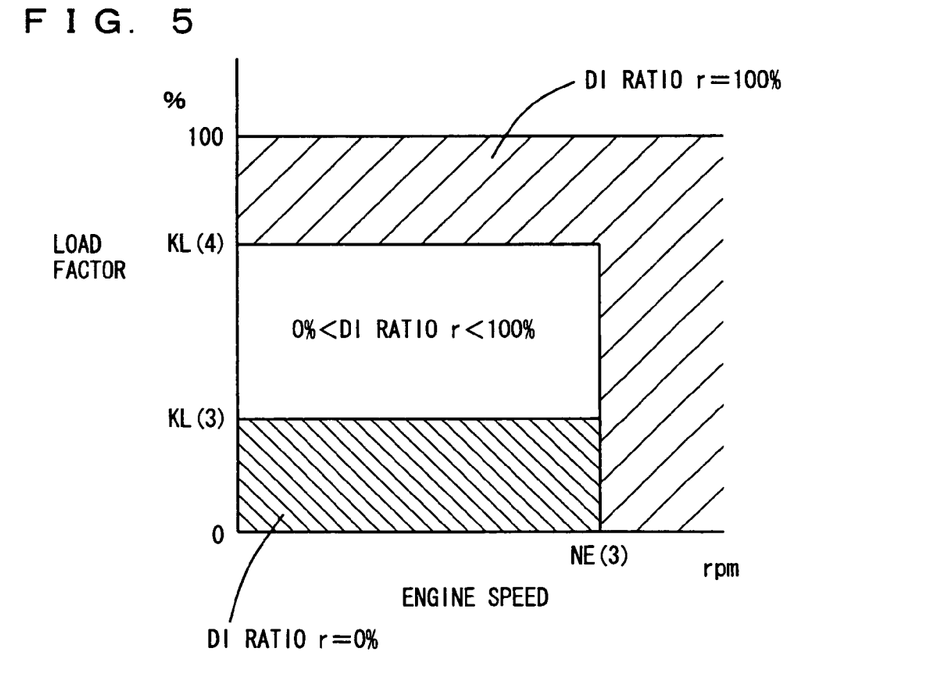
FIG. 5 shows a DI ratio map for a cold state of the engine (1) to which a control device according to an embodiment of the present invention is suitably applied.

Referring to FIGS. 4 and 5, maps each indicating a fuel injection ratio between in-cylinder injector 110 and intake manifold injector 120, identified as information associated with an operation state of the engine, will now be described. Herein, the fuel injection ratio between the two injectors is also expressed as a ratio of the amount of the fuel injected from in-cylinder injector 110 to the total amount of the fuel injected, which is referred to as the "fuel injection ratio of in-cylinder injector 110", or a "DI (Direct Injection) ratio (r)". The maps are stored in the ROM of the engine ECU. FIG. 4 is the map for a warm state of the engine, and FIG. 5 is the map for a cold state of the engine.

In the maps illustrated in FIGS. 4 and 5, with the horizontal axis representing an engine speed and the vertical axis representing a load factor, the fuel injection ratio of in-cylinder injector 110, or the DI ratio r, is expressed in percentage.

As shown in FIGS. 4 and 5, the DI ratio r is set for each operation range that is determined by the engine speed and the load factor of the engine. "DI RATIO r=100%" represents the range where fuel injection is carried out using only in-cylinder injector 110, and "DI RATIO r=0%" represents the range where fuel injection is carried out using only intake manifold injector 120. "DI RATIO r≠0%", "DI RATIO r≠100%" and "0%<DI RATIO r<100%" each represent the range where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of the engine, so that only homogeneous combustion is conducted in the normal operation state of the engine (other than the abnormal operation state such as a catalyst warm-up state during idling).

Further, as shown in FIGS. 4 and 5, the fuel injection ratio between in-cylinder injector 110 and intake manifold injector 120, or, the DI ratio r, is defined individually in the map for the warm state and in the map for the cold state of the engine. The maps are configured to indicate different control ranges of in-cylinder injector 110 and intake manifold injector 120 as the temperature of the engine changes. When the temperature of the engine detected is equal to or higher than a predetermined temperature threshold value, the map for the warm state shown in FIG. 4 is selected; otherwise, the map for the cold state shown in FIG. 5 is selected. One or both of in-cylinder injector 110 and intake manifold injector 120 are controlled based on the selected map and according to the engine speed and the load factor of the engine.

The engine speed and the load factor of the engine set in FIGS. 4 and 5 will now be described. In FIG. 4, NE(1) is set to 2500 rpm to 2700 rpm, KL(1) is set to 30% to 50%, and KL(2) is set to 60% to 90%. In FIG. 5, NE(3) is set to 2900 rpm to 3100 rpm. That is, NE(1)<NE(3). NE(2) in FIG. 4 as well as KL(3) and KL(4) in FIG. 5 are also set as appropriate.

When comparing FIGS. 4 and 5, NE(3) of the map for the cold state shown in FIG. 5 is greater than NE(1) of the map for the warm state shown in FIG. 4. This shows that, as the temperature of the engine is lower, the control range of intake manifold injector 120 is expanded to include the range of higher engine speed. That is, in the case where engine is cold, deposits are unlikely to accumulate in the injection hole of in-cylinder injector 110 (even if the fuel is not injected from in-cylinder injector 110). Thus, the range where the fuel injection is to be carried out using intake manifold injector 120 can be expanded, to thereby improve homogeneity.

When comparing FIGS. 4 and 5, "DI RATIO r=100%" in the range where the engine speed of the engine is NE(1) or higher in the map for the warm state, and in the range where the engine speed is NE(3) or higher in the map for the cold state. In terms of load factor, "DI RATIO r=100%" in the range where the load factor is KL(2) or greater in the map for the warm state, and in the range where the load factor is KL(4) or greater in the map for the cold state. This means that in-cylinder injector 110 solely is used in the range of a predetermined high engine speed, and in the range of a predetermined high engine load. That is, in the high speed range or the high load range, even if fuel injection is carried out using only in-cylinder injector 110, the engine speed and the load of the engine are high, ensuring a sufficient intake air amount, so that it is readily possible to obtain a homogeneous air-fuel mixture even using only in-cylinder injector 110. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, whereby antiknock performance is improved. Further, since the temperature within the combustion chamber is decreased, intake efficiency improves, leading to high power output.

In the map for the warm state in FIG. 4, fuel injection is also carried out using only in-cylinder injector 110 when the load factor is KL(1) or less. This shows that in-cylinder injector 110 alone is used in a predetermined low load range when the temperature of the engine is high. When the engine is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring the minimum fuel injection amount thereof. Thus, in-cylinder injector 110 alone is used in the relevant range.

When comparing FIGS. 4 and 5, there is a range of "DI RATIO r=0%" only in the map for the cold state in FIG. 5. This shows that fuel injection is carried out using only intake manifold injector 120 in a predetermined low load range (KL(3) or less) when the temperature of the engine is low. When the engine is cold and low in load and the intake air amount is small, atomization of the fuel is unlikely to occur. In such a range, it is difficult to ensure favorable combustion with the fuel injection from in-cylinder injector 110. Further, particularly in the low-load and low-speed range, high output using in-cylinder injector 110 is unnecessary. Accordingly, fuel injection is carried out using only intake manifold injector 120, rather than in-cylinder injector 110, in the relevant range.

Further, in an operation other than the normal operation, or, in the catalyst warm-up state during idling of the engine (abnormal operation state), in-cylinder injector 110 is controlled to carry out stratified charge combustion. By causing the stratified charge combustion during the catalyst warm-up operation, warming up of the catalyst is promoted, and exhaust emission is thus improved.

Engine (2) to which Present Control Device is Suitably Applied

Hereinafter, an engine (2) to which the control device of the present embodiment is suitably applied will be described. In the following description of the engine (2), the configurations similar to those of the engine (1) will not be repeated.

Figure 6:
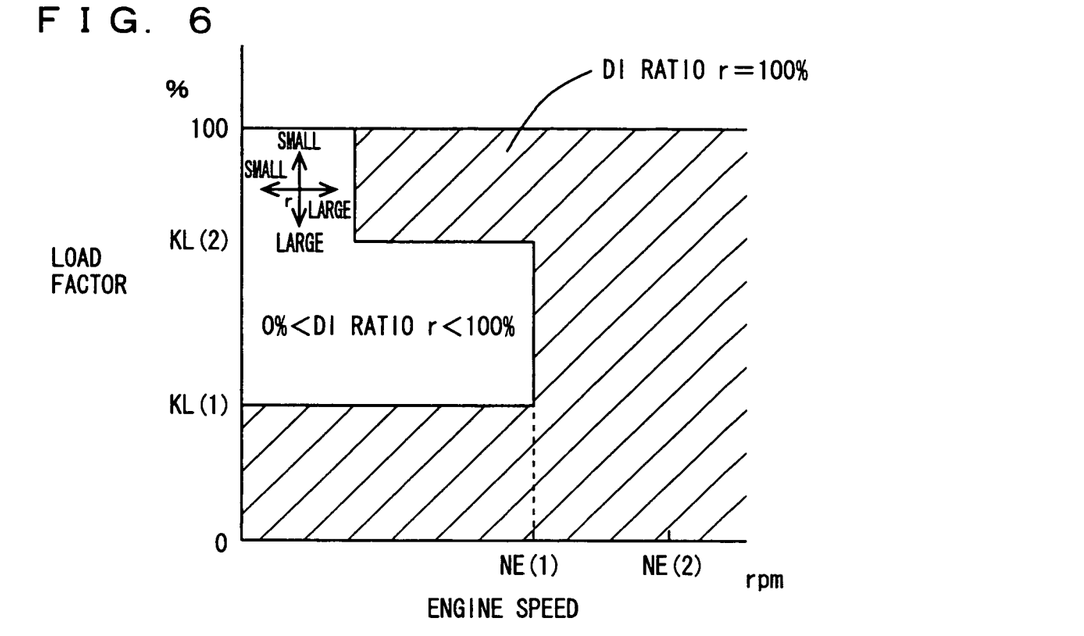
FIG. 6 shows a DI ratio map for a warm state of an engine (2) to which a control device according to an embodiment of the present invention is suitably applied.
Figure 7:
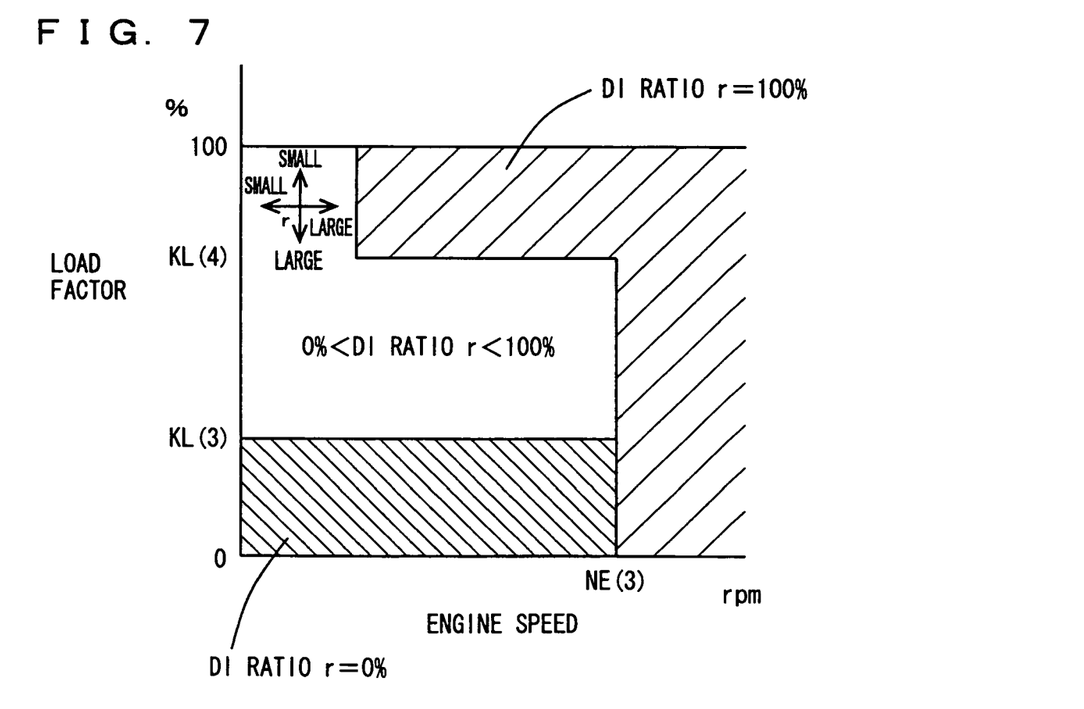
FIG. 7 shows a DI ratio map for a cold state of the engine (2) to which a control device according to an embodiment of the present invention is suitably applied.

Referring to FIGS. 6 and 7, maps each indicating the fuel injection ratio between in-cylinder injector 110 and intake manifold injector 120, identified as information associated with the operation state of the engine, will be described. The maps are stored in the ROM of the engine ECU. FIG. 6 is the map for the warm state of the engine, and FIG. 7 is the map for the cold state of the engine.

FIGS. 6 and 7 differ from FIGS. 4 and 5 in the following points. "DI RATIO r=100%" holds in the range where the engine speed of the engine is equal to or higher than NE(1) in the map for the warm state, and in the range where engine speed is NE(3) or higher in the map for the cold state. Further, except for the low-speed range, "DI RATIO r=100%" holds in the range where the load factor is KL(2) or greater in the map for the warm state, and in the range where the load factor is KL(4) or greater in the map for the cold state. This means that fuel injection is carried out using only in-cylinder injector 110 in the range where the engine speed is at a predetermined high level, and that fuel injection is often carried out using only in-cylinder injector 110 in the range where the engine load is at a predetermined high level. However, in the low-speed and high-load range, mixing of an air-fuel mixture formed by the fuel injected from in-cylinder injector 110 is poor, and such inhomogeneous air-fuel mixture within the combustion chamber may lead to unstable combustion. Thus, the fuel injection ratio of in-cylinder injector 110 is increased as the engine speed increases where such a problem is unlikely to occur, whereas the fuel injection ratio of in-cylinder injector 110 is decreased as the engine load increases where such a problem is likely to occur. These changes in the fuel injection ratio of in-cylinder injector 110, or, the DI ratio r, are shown by crisscross arrows in FIGS. 6 and 7. In this manner, variation in output torque of the engine attributable to the unstable combustion can be suppressed. It is noted that these measures are approximately equivalent to the measures to decrease the fuel injection ratio of in-cylinder injector 110 as the state of the engine moves toward the predetermined low speed range, or to increase the fuel injection ratio of in-cylinder injector 110 as the engine state moves toward the predetermined low load range. Further, except for the relevant range (indicated by the crisscross arrows in FIGS. 6 and 7), in the range where fuel injection is carried out using only in-cylinder injector 110 (on the high speed side and on the low load side), a homogeneous air-fuel mixture is readily obtained even when the fuel injection is carried out using only in-cylinder injector 110. In this case, the fuel injected from in-cylinder injector 110 is atomized within the combustion chamber involving latent heat of vaporization (by absorbing heat from the combustion chamber). Accordingly, the temperature of the air-fuel mixture is decreased at the compression side, and thus, the antiknock performance improves. Further, with the temperature of the combustion chamber decreased, intake efficiency improves, leading to high power output.

In the engine explained in conjunction with FIGS. 4-7, homogeneous combustion is achieved by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be located locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to provide a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idle state) so as to cause a high-temperature combustion gas to reach the catalyst. Further, a certain amount of fuel needs to be supplied. If the stratified charge combustion is employed to satisfy these requirements, the amount of the fuel will be insufficient. If the homogeneous combustion is employed, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine explained in conjunction with FIGS. 4-7, the fuel injection timing of in-cylinder injector 110 is set in the intake stroke in a basic range corresponding to the almost entire range (here, the basic range refers to the range other than the range where semi-stratified charge combustion is carried out with fuel injection from intake manifold injector 120 in the intake stroke and fuel injection from in-cylinder injector 110 in the compression stroke, which is carried out only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the injected fuel, so that the combustion rate increases. The improvement in antiknock performance and the increase in combustion rate can prevent variation in combustion, and thus, combustion stability is improved.

Further, regardless of the temperature of the engine (that is, whether it is in the warm state or in the cold state), the warm state map shown in FIG. 4 or 6 may be used during an idle-off state (when an idle switch is off, or when the accelerator pedal is pressed) (regardless of whether it is in the cold state or in the warm state, in the low load region, in-cylinder injector 110 is used).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of a fuel system of an internal combustion engine including a low-pressure pump supplying fuel from a fuel tank to a fuel injection mechanism and a high-pressure pump provided between said low-pressure pump and said fuel injection mechanism and increasing pressure of the supplied fuel, comprising:
    a detection portion detecting that an operation state of said internal combustion engine is an idle operation state;
    a fuel state detection portion detecting a state of fuel in a pipe connecting said high-pressure pump and said fuel injection mechanism, said fuel state detection portion detecting a state of vaporization of the fuel in said pipe; and
    a control portion controlling said low-pressure pump and said high-pressure pump,
    said control portion controlling said high-pressure pump and said low-pressure pump such that, when said idle operation state is detected, pressure of the fuel discharged from said high-pressure pump and pressure of the fuel discharged from said low-pressure pump are adjusted based on the state of the fuel in said pipe.

2. The control device of a fuel system of an internal combustion engine according to claim 1, wherein said fuel state detection portion detects said state of vaporization based on at least one of a temperature of said internal combustion engine, a temperature of the fuel in said pipe, an engine speed of said internal combustion engine, and a load of said internal combustion engine.

3. The control device of a fuel system of an internal combustion engine according to claim 1, wherein said fuel state detection portion detects said state of vaporization based on a continuation time of the operation state determined by at least one of a temperature of said internal combustion engine, a temperature of the fuel in said pipe, an engine speed of said internal combustion engine, and a load of said internal combustion engine.

4. The control device of a fuel system of an internal combustion engine according to claim 1, wherein said control portion controls said high-pressure pump such that, in the state where the degree of vaporization of the fuel in said pipe is large, the pressure of the fuel discharged from said high-pressure pump is increased.

5. The control device of a fuel system of an internal combustion engine according to claim 1, wherein said control portion controls said high-pressure pump and said low-pressure pump such that, in the state where the degree of vaporization of the fuel in said pipe is small, an increase of the pressure of the fuel discharged from said high-pressure pump is stopped and the pressure of the fuel discharged from said low-pressure pump is adjusted in accordance with said degree of vaporization.

6. The control device of a fuel system of an internal combustion engine according to claim 5, wherein said control portion controls said low-pressure pump such that, in the state where the degree of vaporization of the fuel in said pipe is small, the pressure of the fuel discharged from said low-pressure pump is increased when said degree of vaporization is higher than when said degree of vaporization is lower.

7. The control device of a fuel system of an internal combustion engine according to claim 1, wherein
    a low-pressure fuel pipe system including said low-pressure pump is formed in said fuel system, and
    said low-pressure fuel pipe system is configured to allow adjustment of the pressure of the fuel in the pipe.

8. The control device of a fuel system of an internal combustion engine according to claim 7, wherein
said low-pressure pump is a pump having a discharge amount controllable, and
said control portion adjusts the pressure of the fuel in the pipe in said low-pressure fuel pipe system by a mechanism that changes pressure depending on a flow rate.

9. The control device of a fuel system of an internal combustion engine according to claim 8, wherein said mechanism is a pressure regulator that increases the pressure with an increase of the flow rate.

10. The control device of a fuel system of an internal combustion engine according to claim 7, wherein said control portion adjusts the pressure of the fuel in the pipe in said low-pressure fuel pipe system by a variable pressure regulator.

11. The control device of a fuel system of an internal combustion engine according to claim 1, wherein
said fuel injection mechanism is a first fuel injection mechanism injecting fuel into a cylinder, and
said internal combustion engine further includes a second fuel injection mechanism injecting fuel into an intake manifold.

12. The control device of a fuel system of an internal combustion engine according to claim 11, wherein
said first fuel injection mechanism is an in-cylinder injector, and
said second fuel injection mechanism is an intake manifold injector.

13. A control device of a fuel system of an internal combustion engine including a low-pressure pump supplying fuel from a fuel tank to a fuel injection mechanism and a high-pressure pump provided between said low-pressure pump and said fuel injection mechanism and increasing pressure of the supplied fuel, comprising:
detection means for detecting that an operation state of said internal combustion engine is an idle operation state;
fuel state detection means for detecting a state of fuel in a pipe connecting said high-pressure pump and said fuel injection mechanism, said fuel state detection means including means for detecting a state of vaporization of the fuel in said pipe; and
control means for controlling said low-pressure pump and said high-pressure pump,
said control means including means for controlling said high-pressure pump and said low-pressure pump such that, when said idle operation state is detected, pressure of the fuel discharged from said high-pressure pump and pressure of the fuel discharged from said low-pressure pump are adjusted based on the state of the fuel in said pipe.

14. The control device of a fuel system of an internal combustion engine according to claim 13, wherein said fuel state detection means includes means for detecting said state of vaporization based on at least one of a temperature of said internal combustion engine, a temperature of the fuel in said pipe, an engine speed of said internal combustion engine, and a load of said internal combustion engine.

15. The control device of a fuel system of an internal combustion engine according to claim 13, wherein said fuel state detection means includes means for detecting said state of vaporization based on a continuation time of the operation state determined by at least one of a temperature of said internal combustion engine, a temperature of the fuel in said pipe, an engine speed of said internal combustion engine, and a load of said internal combustion engine.

16. The control device of a fuel system of an internal combustion engine according to claim 13, wherein said control means includes means for controlling said high-pressure pump such that, in the state where the degree of vaporization of the fuel in said pipe is large, the pressure of the fuel discharged from said high-pressure pump is increased.

17. The control device of a fuel system of an internal combustion engine according to claim 13, wherein said control means includes means for controlling said high-pressure pump and said low-pressure pump such that, in the state where the degree of vaporization of the fuel in said pipe is small, an increase of the pressure of the fuel discharged from said high-pressure pump is stopped and the pressure of the fuel discharged from said low-pressure pump is adjusted in accordance with said degree of vaporization.

18. The control device of a fuel system of an internal combustion engine according to claim 17, wherein said control means includes means for controlling said low-pressure pump such that, in the state where the degree of vaporization of the fuel in said pipe is small, the pressure of the fuel discharged from said low-pressure pump is increased when said degree of vaporization is higher than when said degree of vaporization is lower.

19. The control device of a fuel system of an internal combustion engine according to claim 13, wherein
a low-pressure fuel pipe system including said low-pressure pump is formed in said fuel system, and
said low-pressure fuel pipe system is configured to allow adjustment of the pressure of the fuel in the pipe.

20. The control device of a fuel system of an internal combustion engine according to claim 19, wherein
said low-pressure pump is a pump having a discharge amount controllable, and
said control means adjusts the pressure of the fuel in the pipe in said low-pressure fuel pipe system by a mechanism that changes pressure depending on a flow rate.

21. The control device of a fuel system of an internal combustion engine according to claim 20, wherein said mechanism is a pressure regulator that increases the pressure with an increase of the flow rate.

22. The control device of a fuel system of an internal combustion engine according to claim 19, wherein said control means adjusts the pressure of the fuel in the pipe in said low-pressure fuel pipe system by a variable pressure regulator.

23. The control device of a fuel system of an internal combustion engine according to claim 13, wherein
said fuel injection mechanism is a first fuel injection mechanism injecting fuel into a cylinder, and
said internal combustion engine further includes a second fuel injection mechanism injecting fuel into an intake manifold.

24. The control device of a fuel system of an internal combustion engine according to claim 23, wherein
said first fuel injection mechanism is an in-cylinder injector, and
said second fuel injection mechanism is an intake manifold injector.

25. A control device of a fuel system of an internal combustion engine including a low-pressure pump supplying fuel from a fuel tank to a fuel injection mechanism and a high-pressure pump provided between said low-pressure pump and said fuel injection mechanism and increasing pressure of the supplied fuel, said control device comprising an electronic control unit,
said electronic control unit
detecting that an operation state of said internal combustion engine is an idle operation state,
detecting a state of vaporization of fuel in a pipe connecting said high-pressure pump and said fuel injection mechanism, and
controlling said high-pressure pump and said low-pressure pump such that, when said idle operation state is detected, pressure of the fuel discharged from said high-pressure pump and pressure of the fuel discharged from said low-pressure pump are adjusted based on the state of the fuel in said pipe.

* * * * *